United States Patent
Wahlstrom et al.

(10) Patent No.: US 10,599,609 B1
(45) Date of Patent: Mar. 24, 2020

(54) METHOD AND SYSTEM FOR ELASTIC, DISTRIBUTED TRANSCODING

(71) Applicant: EMC Corporation, Hopkinton, MA (US)

(72) Inventors: Mats N. Wahlstrom, Lakewood Ranch, FL (US); Nalinkumar N. Mistry, Ottawa (CA); Jiale Huo, Kanata (CA)

(73) Assignee: EMC IP Holding Company LLC, Hopkinton, MA (US)

( * ) Notice: Subject to any disclaimer, the term of this patent is extended or adjusted under 35 U.S.C. 154(b) by 1011 days.

(21) Appl. No.: 14/674,527

(22) Filed: Mar. 31, 2015

(51) Int. Cl.
*G06F 16/11* (2019.01)
*H04L 29/06* (2006.01)

(52) U.S. Cl.
CPC .......... *G06F 16/116* (2019.01); *G06F 16/113* (2019.01); *H04L 65/60* (2013.01)

(58) Field of Classification Search
CPC .................................................. G06F 17/30067
USPC ........................................................ 707/661
See application file for complete search history.

(56) References Cited

U.S. PATENT DOCUMENTS

| | | | |
|---|---|---|---|
| 8,527,645 B1* | 9/2013 | Proffit | G06F 9/505 709/229 |
| 8,775,648 B1* | 7/2014 | Cassidy | H04L 67/32 709/229 |
| 8,813,245 B1* | 8/2014 | Corley | G06F 21/62 726/27 |
| 2007/0089151 A1* | 4/2007 | Moore | G11B 27/034 725/132 |
| 2008/0231480 A1* | 9/2008 | Lai | H04N 7/17318 341/51 |
| 2010/0241615 A1* | 9/2010 | Marshall | G06Q 10/10 707/661 |
| 2011/0072073 A1* | 3/2011 | Curtis | H04L 67/1002 709/203 |
| 2011/0219322 A1* | 9/2011 | Ramamurthy | H04N 21/252 715/764 |
| 2012/0102154 A1* | 4/2012 | Huang | H04L 65/605 709/219 |
| 2012/0303818 A1* | 11/2012 | Thibeault | G06F 9/5072 709/226 |
| 2013/0114744 A1* | 5/2013 | Mutton | H04N 19/40 375/240.26 |
| 2014/0089998 A1* | 3/2014 | Buehl | H04N 21/23113 725/93 |
| 2014/0119457 A1* | 5/2014 | MacInnis | H04N 19/40 375/240.26 |
| 2014/0280744 A1* | 9/2014 | DuBose | H04L 65/60 709/219 |

* cited by examiner

*Primary Examiner* — Pierre M Vital
*Assistant Examiner* — Andrew N Ho
(74) *Attorney, Agent, or Firm* — Ryan, Mason & Lewis, LLP

(57) ABSTRACT

Example embodiments of the present invention relate to a method and a system for transcoding a media file in an elastic storage infrastructure. The method includes ingesting the media file from intermediate storage, transcoding the media file to one or more output formats in the elastic storage infrastructure, and packaging the one or more transcoded media files for distribution via a content delivery network.

19 Claims, 7 Drawing Sheets

METHOD AND SYSTEM FOR ELASTIC, DISTRIBUTED TRANSCODING

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This application relates to data storage.

BACKGROUND

Computer systems are constantly improving in terms of speed, reliability, and processing capability. As is known in the art, computer systems which process and store large amounts of data typically include one or more processors in communication with a shared data storage system in which the data is stored. The data storage system may include one or more storage devices, usually of a fairly robust nature and useful for storage spanning various temporal requirements, e.g., disk drives. The one or more processors perform their respective operations using the storage system. Mass storage systems (MSS) typically include an array of a plurality of disks with on-board intelligence and communications electronics and software for making the data on the disks available.

Companies that sell data storage systems and the like are very concerned with providing customers with an efficient data storage solution that minimizes cost while meeting customer data storage needs. It would be beneficial for such companies to have a way for reducing the complexity of implementing data storage.

SUMMARY

Example embodiments of the present invention relate to a method and a system for transcoding a media file in an elastic storage infrastructure. The method includes ingesting the media file from intermediate storage, transcoding the media file to one or more output formats in the elastic storage infrastructure, and packaging the one or more transcoded media files for distribution via a content delivery network.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every Figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

DETAILED DESCRIPTION

Figure 1:
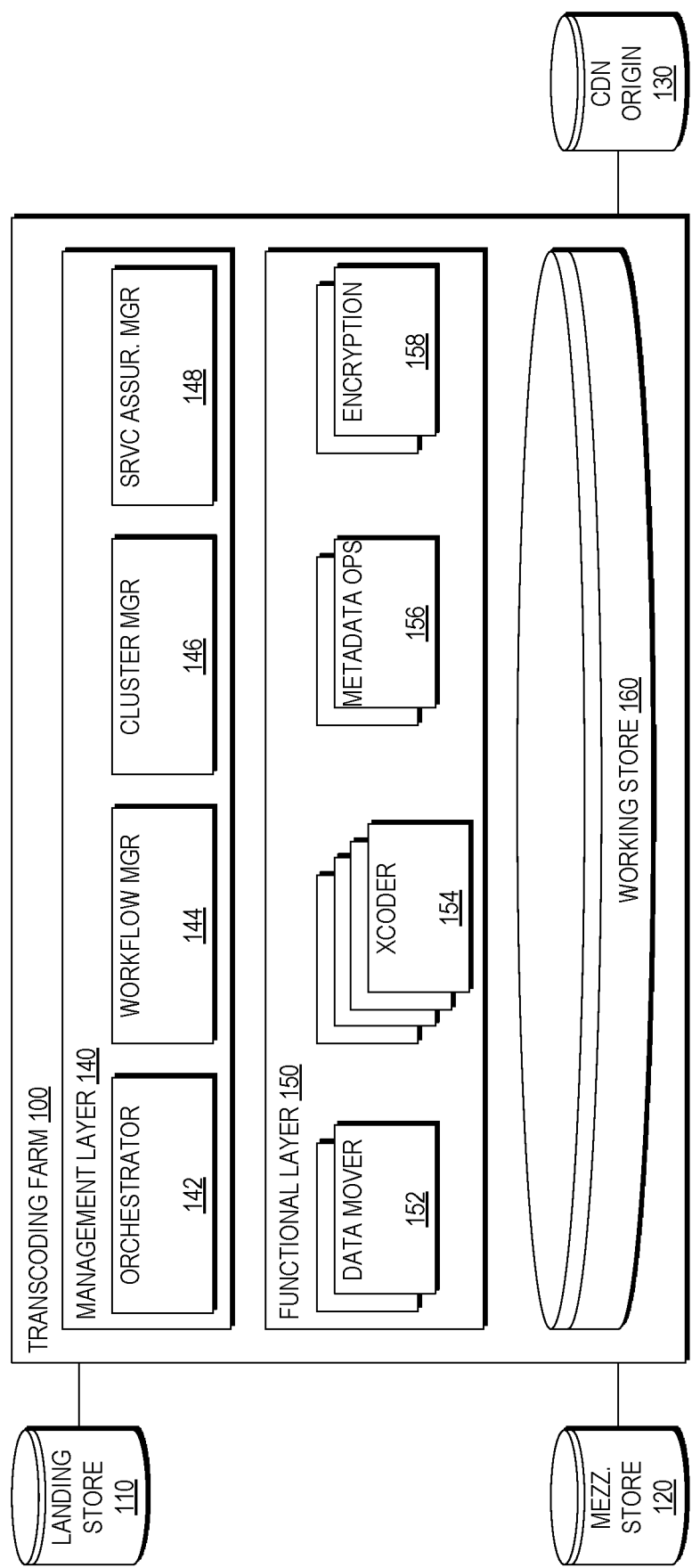
FIG. 1 is a block diagram of a system including a transcoding farm according to an example embodiment of the present invention.

Traditionally, service providers have required dedicated appliances, services, and storage (i.e., silos) to transcode media in their infrastructure. However, as modern information technology (IT) markets move to a software-only and elastic infrastructure, service providers struggle to take advantage of these technological advances. Accordingly, service providers are redesigning their video architecture to enable new features such as Internet protocol television (IPTV), network-based digital video recorder (nDVR), and delivering media over the Internet at over-the-top (OTT) content.

In addition, network function virtualization (NFV) is a major disruption taking place in the telco/service provider space to move from a physical infrastructure to a virtual infrastructure. The NFV Industry Specification Group (ISG) has recognized that traditional networking is too expensive, rigid, time-consuming, and designed around proprietary hardware with long amortization cycles and high servicing costs. Accordingly, the telco/service provider industry is working toward developing standards to define the framework for NFV including specifications, terminology, and use-case scenarios for use by telcos and software and hardware vendors.

A backend video infrastructure for transcoding is typically a static environment that consists of either a storage area network (SAN) infrastructure with a shared filesystem or a network attached storage (NAS) scale-out architecture. However, due to the number of video titles needing to be transcoded on a daily basis and the quality of video improving (thereby resulting in larger files), service providers desire to drive cost down and be able to be elastic to scale out as demand increases.

Virtual data centers have revolutionized enterprise IT, making just about every aspect more efficient and cost effective. Application deployment, software delivery, service activation, resource allocation, maintenance, and management have all become simpler, more reliable, and more cost effective, enabling enterprises to make better use of IT budgets and create efficiencies like never before. Virtual server infrastructures (VSI), such as EMC® ScaleIO® by EMC Corporation of Hopkinton, Mass., provide an architecture and features as a storage foundation for virtual data centers. Such infrastructures allow each virtual server to be a converged storage and compute resource, enabling application and storage processing at the same time. Individual physical servers become building blocks in the storage/compute cluster that forms the foundation for the integrated virtual environment. The technology features linear scalability of capacity and performance and elasticity in resource allocation reducing concerns regarding resource starvation, oversubscription, underutilization and other inefficiencies.

I/O processing is massively parallel and is distributed among the servers in the cluster by serving I/O requests through multiple controllers and multiple I/O processing agents simultaneously. Therefore, such clusters distribute I/O requests over the population of servers.

FIG. 1 is a block diagram of a system according to an example embodiment of the present invention. FIG. 1 illustrates a framework to enable VSIs, such as ScaleIO, to become application-aware and to manage transcoding workloads and be able to scale out their environment as needed. Accordingly, this architecture also eliminates the need for a siloed SAN infrastructure and shared file system and enables the introduction of a distributed elastic workload engine to provide an elastic and distributed transcoding farm that is completely separated from the underlying hardware. It should be understood that this framework may be leveraged outside of the video space for similar requirements.

As illustrated in FIG. 1, the system comprises a transcoding farm 100, a landing store 110, a mezzanine store 120, and a content delivery network (CDN) origin 130. The landing store 110 and CDN origin 130 may be Isilon® scale-out network attached storage (NAS) by EMC Corporation of Hopkinton, Mass. The mezzanine store 120 may be ViPR® software defined storage by EMC Corporation of Hopkinton, Mass.

The transcoding farm 100 may comprise a management layer 140, a functional layer 150, and a working store 160. The management layer may comprise an orchestrator 142, a workflow manager 144, a cluster manager 146, and a service assurance manager 148. The cluster manager 146 may monitor provisioned resources in the transcoding farm 100 to determine whether sufficient resources are available to perform the transcoding and other metadata operations functions. The service assurance manager 148 may provide functions such as troubleshooting, remediation, performance monitoring, and logging (e.g., events/alerts, resource utilization, requests pending, requests in-progress, requests completed with elapsed time, memory utilization).

The functional layer 150 may comprise one or more data movers 152, one or more virtual transcoders 154, a metadata operations module 156, and an encryption module 158. The data mover 152 may move data among the landing store 110, the mezzanine store 120, the CDN origin 130, and the working store 160. The transcoders may work in parallel with, for example, each transcoder working on a portion of a single stream for transcoding.

Figure 2:
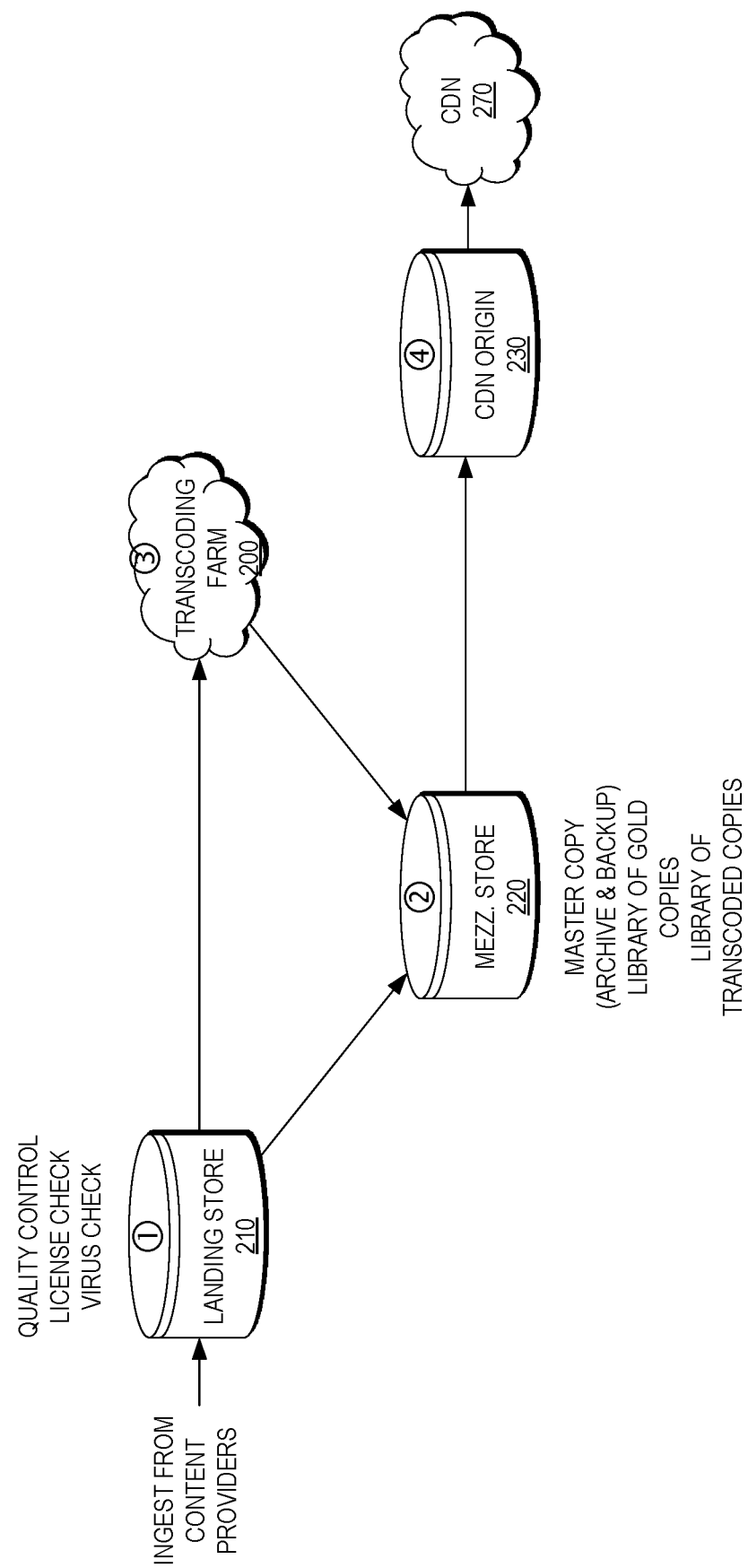
FIGS. 2-3 are logical block diagrams illustrating the flow of operations among a landing store, a mezzanine store, a transcoding farm, and a CDN origin in the system of FIG. 1.

FIG. 2 is a logical block diagram illustrating the flow of operations in the system of FIG. 1. As illustrated in FIG. 2, the system may ingest, for example, a video file from a content provider to an intermediate landing storage 210. The metadata operations module 156 then may perform certain quality control functions such as a license check and a virus check prior to the file being brought into the transcoding farm 100. The data mover 152 then may copy the file from the landing store 210 to the mezzanine store 220 for archival and/or backup in a library of "gold" copies (i.e., original copies of the file received from the content providers). The data mover 152 also may copy the file to the transcoding farm 200 for transcoding (as will be described in greater detail below) and copy the transcoded file to the mezzanine store 220 for archival and/or backup. The transcoded file then may be pushed to the CDN origin 230 for delivery via the CDN 270.

Figure 3:
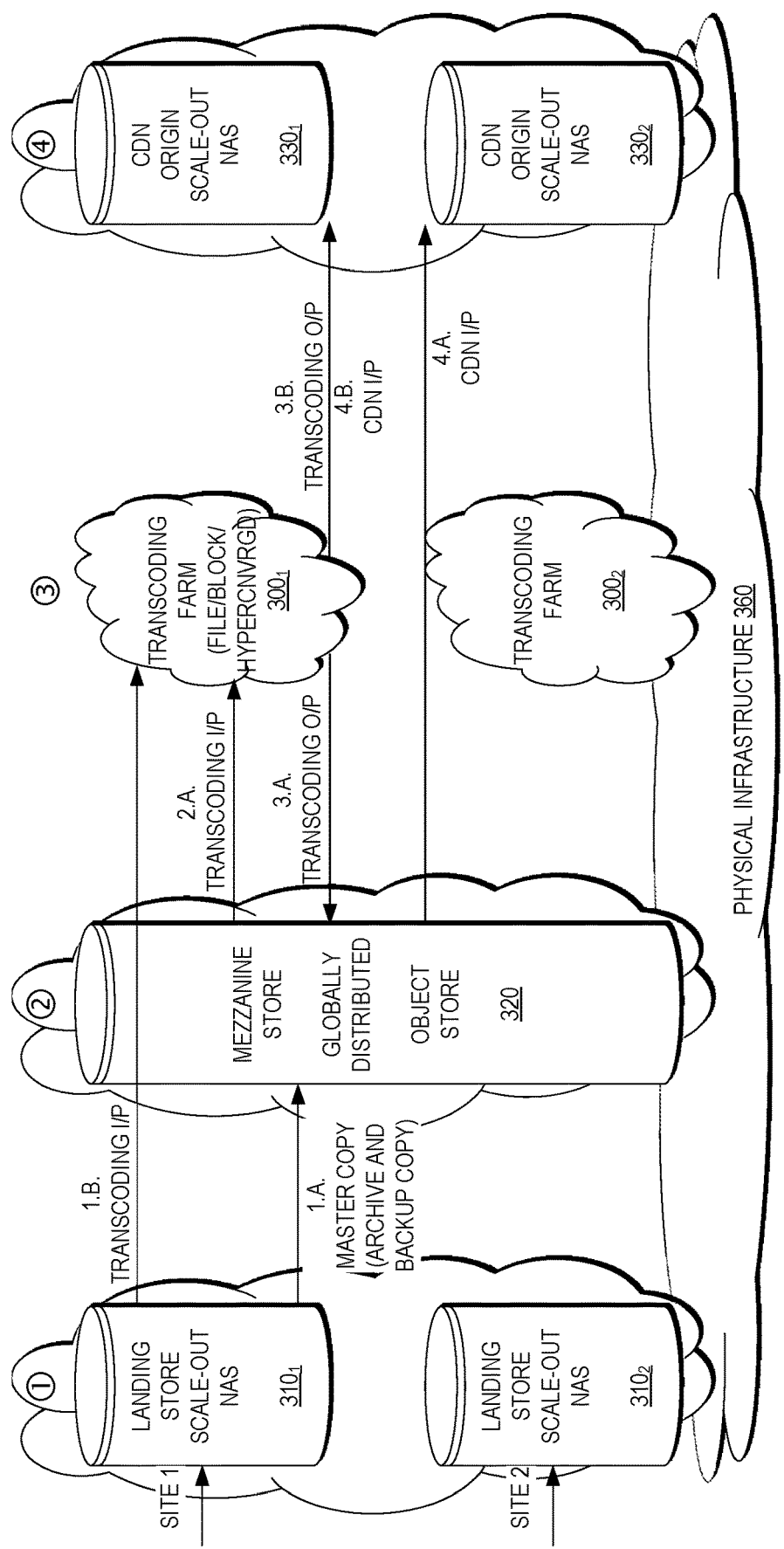

FIG. 3 is a logical block diagram illustrating the flow of operations in the system of FIG. 1. As illustrated in FIG. 3, the system may receive content from Site 1 and Site 2, with the content being stored to respective landing stores (e.g., scale-out NAS) $310_1$, $310_2$. The data mover 152 then may (1.A) make a master copy of the file (i.e., archive and backup copy) to the mezzanine store 220. The data mover 152 also may copy the file to the transcoding farm ($300_1$) as a transcoding input either (2.A) from the mezzanine store 320 or (1.B) from the landing store $310_1$. The transcoding farm $300_1$ then may transcode the file and the data mover 152 may (3.A) store the transcoding output to the mezzanine store 320 (i.e., archive and backup copy) and (3.B) store the transcoding output to the CDN origin $330_1$, $330_2$. The transcoding output also may be referred to as (4.B) the CDN input which alternatively may be copied (4.A) from the archive copy of the transcoded file stored to the mezzanine store 320. Virtualization will ensure that, by dynamically allocating resources, the system can share the resources and make the system perform better without regard to the physical infrastructure 360.

Figure 4:
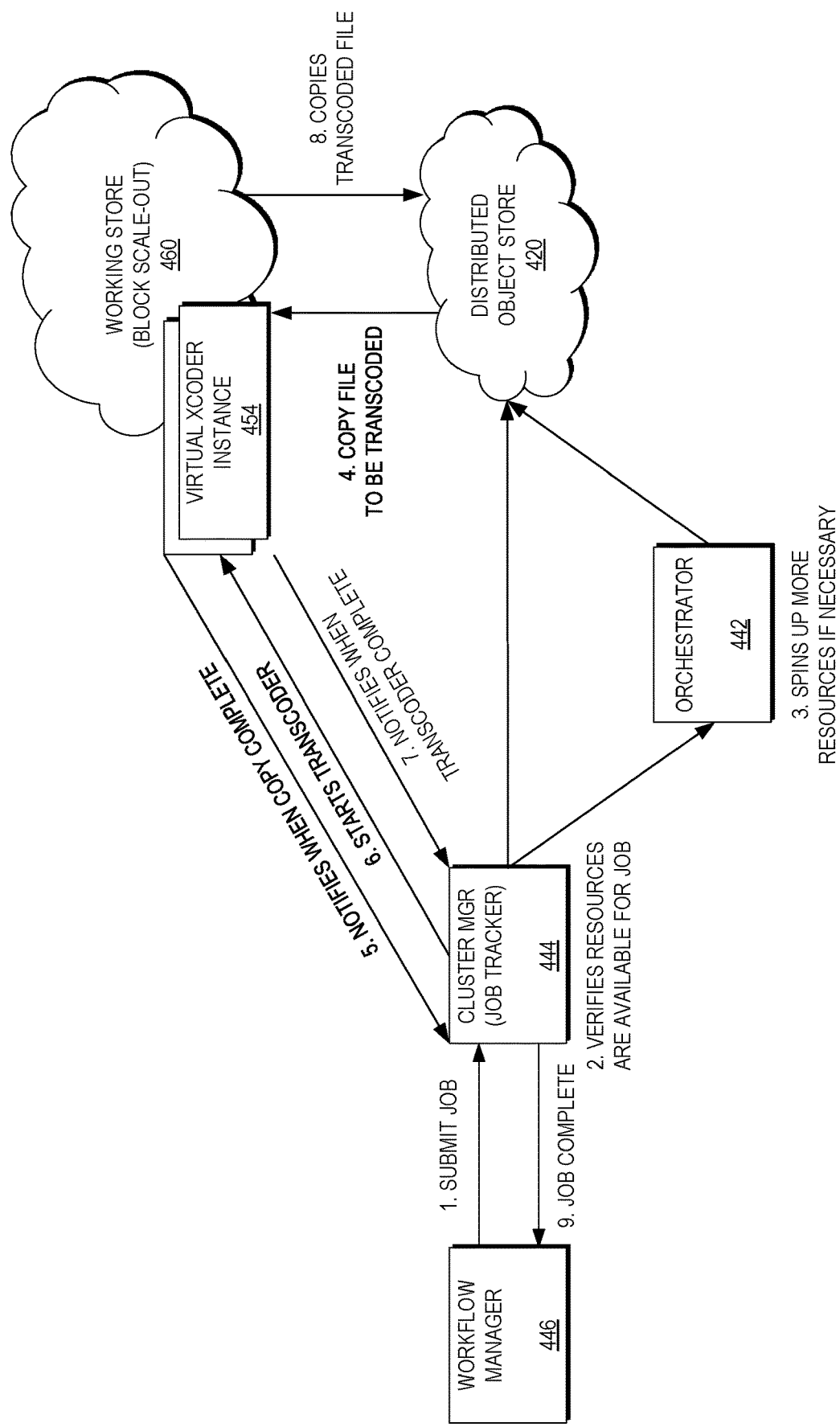
FIG. 4 is a workflow diagram illustrating a method of performing a transcoding job according to an example embodiment of the present invention.

FIG. 4 is a workflow diagram illustrating a method according to an example embodiment of the present invention. As illustrated in FIG. 4, a workflow manager 446 (1) submits a transcoding job to a cluster manager 444 (i.e., job tracker). The workflow manager 446 may determine the job attributes according to service provider requirements regarding device and network capabilities, for example. The cluster manager 444 then may (2) determine whether sufficient resources are provisioned in the transcoding farm for the job. If there are not sufficient resources, the orchestrator 442 then may (3) spin up (i.e., provision) more resources. With sufficient resources in the transcoding farm, the data mover 152 may (4) copy the file to be transcoded from the intermediate storage 420 to the working store 460 in the transcoding farm. The virtual transcoder instance 454 assigned to the job by the cluster manager 444 then may (5) notify the cluster manager 444 when copying the file is complete. In turn, the cluster manager 444 may (6) start the transcoder 454 transcoding the file and await (7) notification when the transcoder 454 is complete. The data mover 152 then may (8) copy the transcoded file to the intermediate storage 420 for, for example, archival purposes. The cluster manager 444 then may (9) inform the workflow manager 446 that the transcoding job is complete.

It should be understood that the workflow manager 446 may manage a queue of transcoding jobs to be performed in the transcoding farm 100 and that the workflow manager 446 and cluster manager 444 may submit a plurality of transcoding jobs to the transcoding farm 100 for parallel processing. The workflow manager 446 may maintain a plurality of queues (e.g., pending, working, completed). The cluster manager 444 may take/receive jobs from the pending queue, assign resources in the transcoding farm 100 for transcoding the file, and wait for notification of transcoding completion. The cluster manager 444 then may notify the workflow manager 446 that transcoding is complete and that the transcoded file is ready for retrieval by the data mover for copying to the CDN origin. The cluster manager 444 then may release resources in the transcoding farm 100 used for performing the now-completed job and take/receive another job from the workflow manager 446 pending queue. In other words, in certain embodiments the cluster manager 444 is responsible for dispatching transcoder jobs, building out new virtual transcoders, and keeping track of which servers in the transcoder farm 100 have transcoder jobs running. The servers in the transcoder farm 100 may run a client engine and may be responsible for starting transcoding jobs locally, monitoring transcoding job progress, and reporting back to the cluster manager 444 regarding failed and completed transcoding jobs.

Figure 5A:
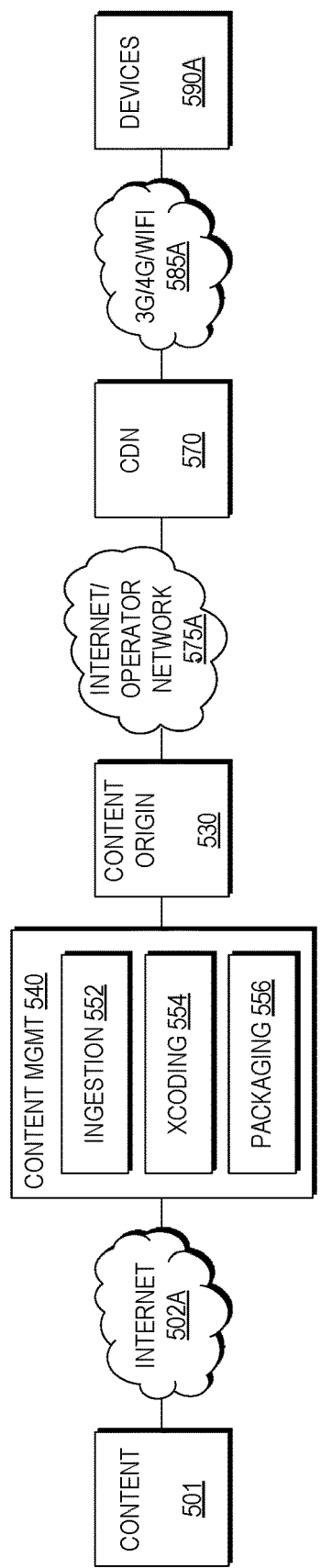
FIGS. 5A-5B are example high level block diagrams illustrating reference architectures for transcoding content for consumption.
Figure 5B:
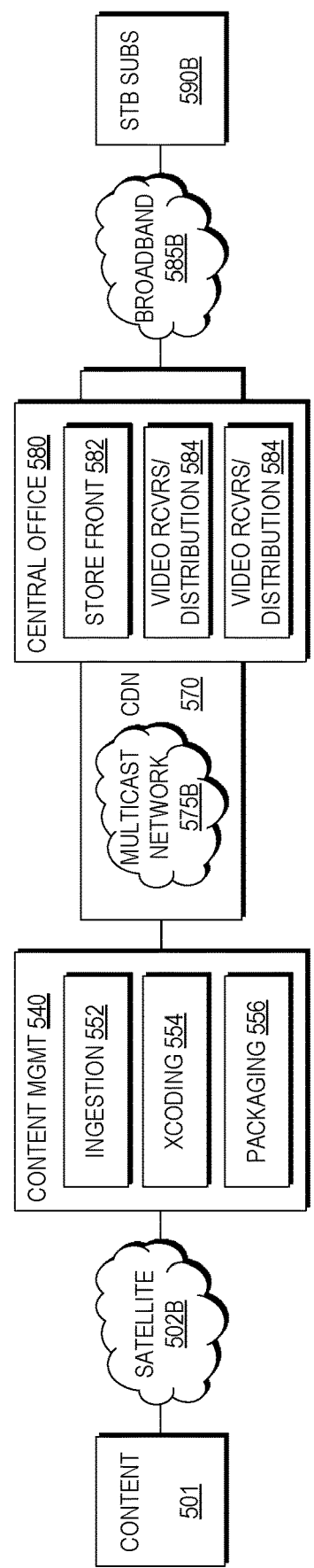

FIGS. 5A-5B are example high level reference architectures. FIG. 5A is a block diagram illustrating a reference architecture for transcoding content 501 for consumption by devices 590A such as computers, mobile phones, and tablets. FIG. 5B is a block diagram illustrating a reference architecture for transcoding content 501 for consumption by subscription devices 590B such as a set top box (STB). As illustrated in FIGS. 5A-5B, content 501 for transcoding may be introduced into the system via the Internet 502A or via a satellite connection 502B, respectively. Typically, such content includes very large files (e.g., 400 GB) and is made available to service providers (e.g., Verizon, AT&T, Cox, and Comcast).

Once the service providers receive the files (e.g., to the landing store 110 of FIG. 1), they perform content management 540 functions to make the files work with supported players for consumption (e.g., devices 590A such as computers, mobile phones, and tablets and subscription devices 590B such as a STB). First, the service providers ingest 552 the file. Typically, this may involve the service provider performing a license check and ensuring the file is valid and not corrupt. Then the service provider may submit the file to the transcoding farm for transcoding 554 to, for example, turn it into multiple formats depending on different orders. In certain embodiments, the service provider may have post-transcoding packaging 556 operations to perform on the transcoded file(s) such as setting up ordering information, adding subtitles, and inserting advertisements.

The packaged transcoded files then may be submitted to the CDN 570. As illustrated in FIG. 5A, this may involve storing the file to the content origin 530 and making the file available over the Internet or the service providers/operator network 575A for subsequent transmission over, for example, a wireless (e.g., 3G/4G/WiFi) network 585A to various devices 590A. As illustrated in FIG. 5B, the CDN 570 may include a multicast network 575B and a central office 580 providing a store front 582 and multiple video receivers/distribution 584 for broadcast of the file over a broadband connection 585B to STB subscribers 590B.

Figure 6:
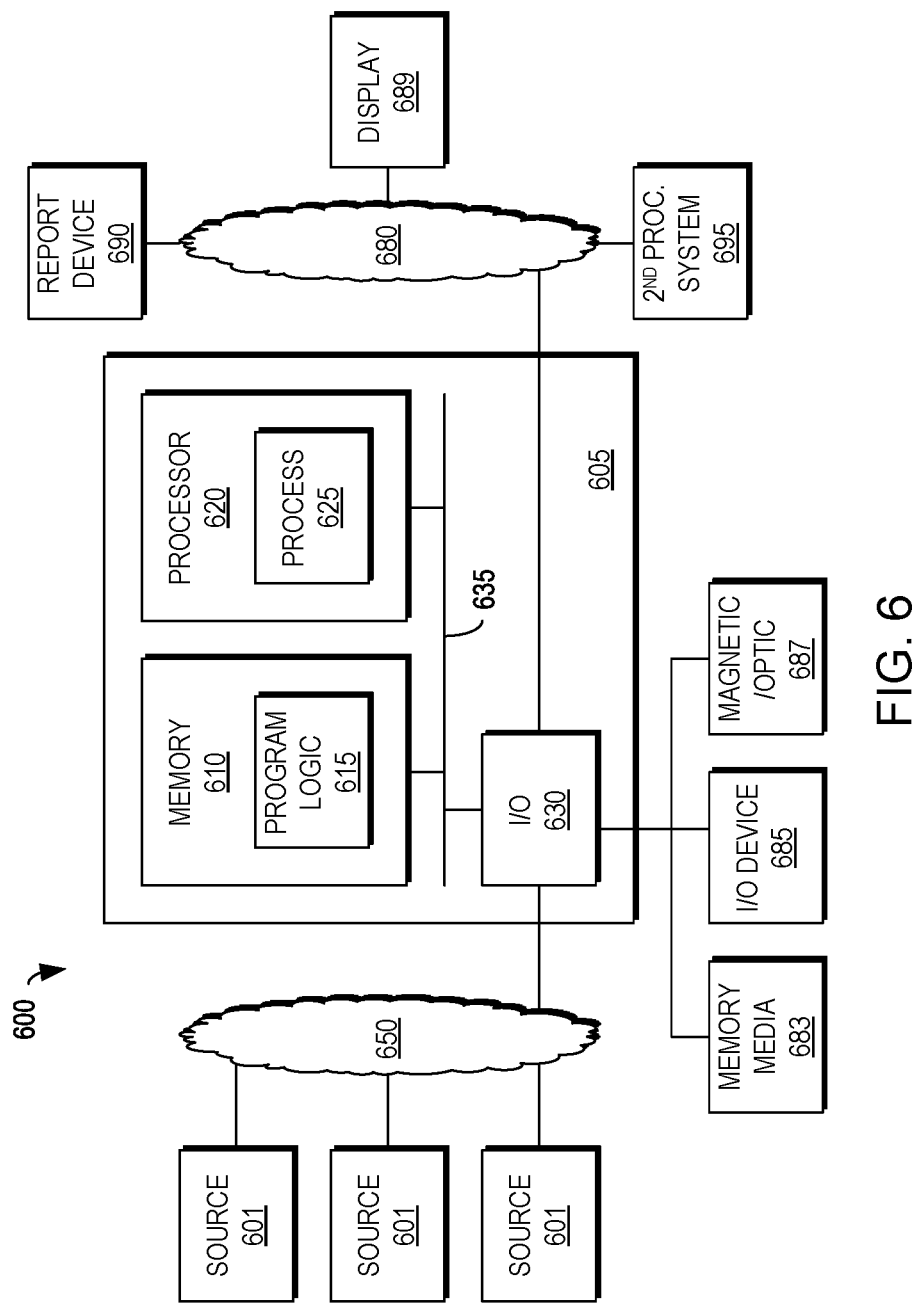
FIG. 6 is a block diagram of an example embodiment apparatus according to the present invention.

FIG. 6 is a block diagram of an example embodiment apparatus 605 according to the present invention. The apparatus 605 may be part of a system 600 and includes memory 610 storing program logic 615, a processor 620 for executing a process 625, and a communications I/O interface 630, connected via a bus 635. The I/O interface 630 may provide connectivity to memory media 683, I/O device 685, and drives 687, such as magnetic or optical drives. The apparatus 605 is configured to communicate with a plurality of sources 601 via a network 650 using the I/O interface 630. The apparatus 605 is further configured to communicate with a display 689, a report device 690, and a second processing system 695 via a network 680 using the I/O interface 630.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium. When the program code is loaded into and executed by a machine, such as the computer of FIG. 6, the machine becomes an apparatus for practicing the invention. When implemented on one or more general-purpose processors, the program code combines with such a processor to provide a unique apparatus that operates analogously to specific logic circuits. As such, a general purpose digital machine can be transformed into a special purpose digital machine.

Figure 7:
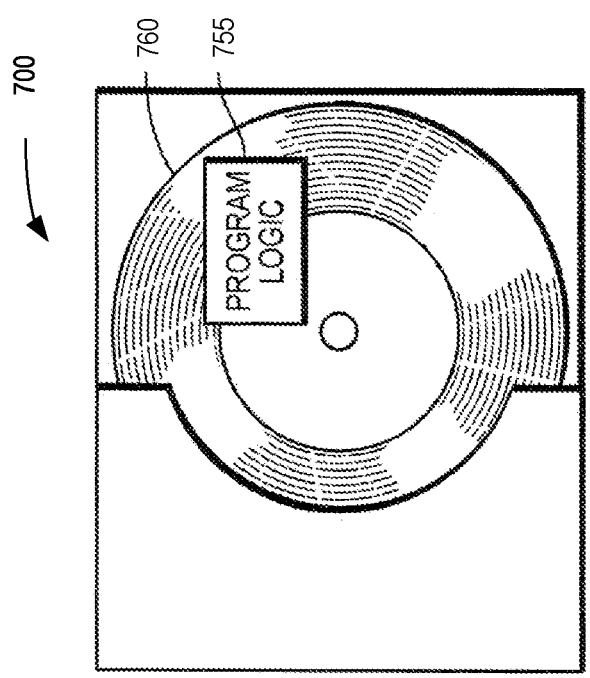
FIG. 7 is diagram of an example embodiment of the present invention embodied in computer program code.

FIG. 7 is a block diagram of a computer program product 700 including program logic 755, encoded on a computer-readable medium 760 in computer-executable code configured for carrying out the methods of the invention, according to an example embodiment of the present invention. The logic for carrying out the method may be embodied as part of the aforementioned system, which is useful for carrying out a method described with reference to embodiments shown.

Although the foregoing invention has been described in some detail for purposes of clarity of understanding, it will be apparent that certain changes and modifications may be practiced within the scope of the appended claims. The scope of the invention is limited only by the claims and the invention encompasses numerous alternatives, modifications, and equivalents. Numerous specific details are set forth in the above description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured. Accordingly, the above implementations are to be considered as illustrative and not restrictive, and the invention is not to be limited to the details given herein, but may be modified within the scope and equivalents of the appended claims.

What is claimed is:

1. A computer implemented method for transcoding a plurality of media files using a transcoding farm comprising:
   ingesting, by the transcoding farm, a plurality of media files from intermediate storage, wherein the transcoding farm includes a virtual data center having elastic resources;
   transcoding, by the transcoding farm, the plurality of media files in parallel to a plurality of output formats in an elastic storage infrastructure; and
   packaging, by the transcoding farm, the plurality of transcoded media files for distribution via a content delivery network;
   wherein ingesting the plurality of media files from the intermediate storage comprises receiving a plurality of transcoding processing jobs and managing the plurality of transcoding jobs utilizing a first job queue for pending transcoding jobs and at least a second job queue for working transcoding jobs;
   wherein transcoding the plurality of media files in parallel to the plurality of output formats in the elastic storage infrastructure comprises:
     selecting a given one of the transcoding jobs in the first job queue;
     assigning the given transcoding job to a given set of resources providing a given virtual transcoder instance in the elastic storage infrastructure;
     moving the given transcoding job from the first job queue to the second job queue;

utilizing the given virtual transcoder instance to transcode one or more of the plurality of media files in the given transcoding job;

receiving a notification from the given virtual transcoder instance that the given transcoding job is completed;

removing the given transcoding job from the second queue; and releasing the given set of resources providing the given virtual transcoder instance in the elastic storage infrastructure for use in dynamically instantiating one or more additional virtual transcoder instances for one or more other ones of the plurality of transcoding jobs in the first queue; and wherein assigning the given transcoding job to the given set of resources providing the given virtual transcoder instance in the elastic storage infrastructure comprises:

identifying a set of performance requirements for the given transcoding job;

determining whether the elastic storage infrastructure has sufficient available resources to meet the set of performance requirements for the given transcoding job;

responsive to determining that the elastic storage infrastructure has sufficient available resources to meet the set of performance requirements for the given transcoding job, dynamically instantiating the given virtual transcoder instance utilizing a subset of the available resources in the elastic storage infrastructure; and responsive to determining that the elastic storage infrastructure does not have sufficient available resources to meet the set of performance requirements for the given transcoding job, provisioning additional resources in the elastic storage infrastructure and dynamically instantiating the given virtual transcoder instance utilizing the additional resources provisioned in the elastic storage infrastructure.

2. The method of claim 1 wherein the transcoding the plurality of media files to the plurality of output formats in the elastic storage infrastructure comprises performing pre-transcoding service provider operations, transcoding, and post-transcoding service provider operations in the elastic storage infrastructure.

3. The method of claim 2 wherein the transcoding the plurality of media files to the plurality of output formats in the elastic storage infrastructure further comprises:

submitting a respective transcoding job for each output format;

copying the media files from the intermediate storage to a working storage in the elastic storage infrastructure; and processing each transcoding job in a respective dynamically instantiated virtual transcoder instance in the elastic storage infrastructure.

4. The method of claim 3 wherein processing each transcoding job in a respective one of the dynamically instantiated virtual transcoder instances in the elastic storage infrastructure comprises managing operation and provisioning of elastic storage infrastructure resources.

5. The method of claim 4 wherein managing operation and provisioning of elastic storage infrastructure resources comprises tracking a status of each respective transcoding job.

6. The method of claim 3 wherein processing each transcoding job in a respective dynamically instantiated virtual transcoder instance in the elastic storage infrastructure comprises:

receiving a first notification from the elastic storage infrastructure that copying the media file from the intermediate storage to the working storage in the elastic storage infrastructure is complete;

sending a command to start transcoding the media file; and receiving a second notification from the elastic storage infrastructure that transcoding each of the media files is complete.

7. The method of claim 1 wherein ingesting a media file from intermediate storage for transcoding comprises:

receiving the media file from a content provider; and storing the media file to intermediate storage.

8. The method of claim 7 wherein ingesting a media file from intermediate storage for transcoding further comprises:

retrieving the media file from the intermediate storage;

performing pre-transcoding service provider operations on the media file; and copying the media file to mezzanine storage for archival.

9. The method of claim 1 wherein packaging the one or more transcoded media files for distribution via a content delivery network comprises:

storing the one or more transcoded media files to mezzanine storage for archival;

performing post-transcoding service provider operations on one or more of the one or more transcoded media files; and storing the one or more transcoded media file to content delivery network origin storage.

10. A system for transcoding a plurality of media files comprising:

a transcoding farm comprising a virtual data center having elastic resources, the transcoding farm being configured:

to ingest a plurality of media files in parallel from an intermediate storage;

to transcode the plurality of media files a plurality of output formats in an elastic storage infrastructure; and to package the plurality of transcoded media files for distribution via a content delivery network;

wherein ingesting the plurality of media files from the intermediate storage comprises receiving a plurality of transcoding processing jobs and managing the plurality of transcoding jobs utilizing a first job queue for pending transcoding jobs and at least a second job queue for working transcoding jobs;

wherein transcoding the plurality of media files in parallel to the plurality of output formats in the elastic storage infrastructure comprises:

selecting a given one of the transcoding jobs in the first job queue;

assigning the given transcoding job to a given set of resources providing a given virtual transcoder instance in the elastic storage infrastructure;

moving the given transcoding job from the first job queue to the second job queue;

utilizing the given virtual transcoder instance to transcode one or more of the plurality of media files in the given transcoding job;

receiving a notification from the given virtual transcoder instance that the given transcoding job is completed;

removing the given transcoding job from the second queue; and releasing the given set of resources providing the given virtual transcoder instance in the elastic storage infrastructure for use in dynamically instantiating one or more additional virtual transcoder instances for one or more other ones of the plurality of transcoding jobs in the first queue; and wherein assigning the given transcoding job to the given set of resources providing the given virtual transcoder instance in the elastic storage infrastructure comprises:

identifying a set of performance requirements for the given transcoding job;

determining whether the elastic storage infrastructure has sufficient available resources to meet the set of performance requirements for the given transcoding job;

responsive to determining that the elastic storage infrastructure has sufficient available resources to meet the set of performance requirements for the given transcoding job, dynamically instantiating the given virtual transcoder instance utilizing a subset of the available resources in the elastic storage infrastructure; and responsive to determining that the elastic storage infrastructure does not have sufficient available resources to meet the set of performance requirements for the given transcoding job, provisioning additional resources in the elastic storage infrastructure and dynamically instantiating the given virtual transcoder instance utilizing the additional resources provisioned in the elastic storage infrastructure.

11. The system of claim 10 wherein the transcoding farm is further configured to perform pre-transcoding service provider operations and post-transcoding service provider operations in the elastic storage infrastructure.

12. The system of claim 11 wherein the transcoding farm is further configured to:

submit a respective transcoding job for each output format; and copy the media file from the intermediate storage to a working storage in the elastic storage infrastructure and process each transcoding job in a respective dynamically instantiated virtual transcoder instance in the elastic storage infrastructure.

13. The system of claim 12 wherein the transcoding farm is further configured to manage operation and provisioning of elastic storage infrastructure resources.

14. The system of claim 13 wherein the transcoding farm is further configured to track a status of each respective transcoding job.

15. The system of claim 12 wherein the transcoding farm is further configured to receive a first notification from the elastic storage infrastructure that copying the media file from the intermediate storage to the working storage in the elastic storage infrastructure is complete, send a command to start transcoding the media file, and receive a second notification from the elastic storage infrastructure that transcoding the media file is complete.

16. The system of claim 10 wherein the transcoding farm is further configured to receive the media file from a content provider and store the media file to intermediate storage.

17. The system of claim 16 wherein the transcoding farm is further configured:

to perform pre-transcoding service provider operations on the media file; and to retrieve the media file from the intermediate storage and copy the transcoded media file to mezzanine storage for archival.

18. The system of claim 10 wherein the transcoding farm is further configured:

to perform post-transcoding service provider operations on one or more of the one or more transcoded media files; and to store the one or more transcoded media files to mezzanine storage for archival and store the one or more transcoded media file to content delivery network origin storage.

19. A computer program product including a non-transitory computer readable storage medium having computer program code encoded thereon comprising:

computer program code for ingesting, by a transcoding farm, a plurality of media files from intermediate storage, wherein the transcoding farm includes a virtual data center having elastic resources;

computer program code for transcoding, by the transcoding farm, the plurality of media files in parallel to a plurality of output formats in an elastic storage infrastructure; and computer program code for packaging, by the transcoding farm, the plurality of transcoded media files for distribution via a content delivery network;

wherein ingesting the plurality of media files from the intermediate storage comprises receiving a plurality of transcoding processing jobs and managing the plurality of transcoding jobs utilizing a first job queue for pending transcoding jobs and at least a second job queue for working transcoding jobs;

wherein transcoding the plurality of media files in parallel to the plurality of output formats in the elastic storage infrastructure comprises:

selecting a given one of the transcoding jobs in the first job queue;

assigning the given transcoding job to a given set of resources providing a given virtual transcoder instance in the elastic storage infrastructure;

moving the given transcoding job from the first job queue to the second job queue;

utilizing the given virtual transcoder instance to transcode one or more of the plurality of media files in the given transcoding job;

receiving a notification from the given virtual transcoder instance that the given transcoding job is completed;

removing the given transcoding job from the second queue; and releasing the given set of resources providing the given virtual transcoder instance in the elastic storage infrastructure for use in dynamically instantiating one or more additional virtual transcoder instances for one or more other ones of the plurality of transcoding jobs in the first queue; and wherein assigning the given transcoding job to the given set of resources providing the given virtual transcoder instance in the elastic storage infrastructure comprises:

identifying a set of performance requirements for the given transcoding job;

determining whether the elastic storage infrastructure has sufficient available resources to meet the set of performance requirements for the given transcoding job;

responsive to determining that the elastic storage infrastructure has sufficient available resources to meet the set of performance requirements for the given transcoding job, dynamically instantiating the given virtual transcoder instance utilizing a subset of the available resources in the elastic storage infrastructure; and responsive to determining that the elastic storage infrastructure does not have sufficient available resources to meet the set of performance requirements for the given transcoding job, provisioning additional resources in the elastic storage infrastructure and dynamically instantiating the given virtual transcoder instance utilizing the additional resources provisioned in the elastic storage infrastructure.

* * * * *